3,202,692
DECACHLORO-3-HYDROXYPENTACYCLO-
DECANE-3-PHOSPHONATES
Edward D. Weil, Lewiston, and Keith J. Smith, Lockport,
N.Y., assignors to Hooker Chemical Corporation,
Niagara Falls, N.Y., a corporation of New York
No Drawing. Filed July 7, 1961, Ser. No. 122,402
8 Claims. (Cl. 260—461)

This invention concerns novel pentacyclic compositions of matter useful as toxicants, fouling retardants, intermediates for organic synthesis, and as flame retardants for resins and paints. More particularly, this invention describes a new class of compounds, decachloro-3-hydroxypentacyclo[5.3.0.0$^{2,6}$.0$^{4,10}$.0$^{5,9}$] decane - 3 phosphonates, which because of their apparent toxicity or repulsion toward lower forms of marine life such as barnacles, function effectively as marine fouling retardants. The scope of the present invention encompasses the compounds within the generic formula below (numbering of the positions is shown):

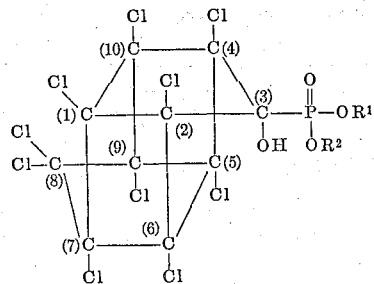

where $R^1$ and $R^2$ are members selected from the group consisting of hydrogen, alkyl, substituted alkyl, aryl, substituted aryl and heterocyclic radicals, with the option that $R^1$ and $R^2$, when conjoined, are chosen from the group consisting of alkylene, substituted alkylene, arylene, substituted arylene, and divalent heterocyclic radicals.

By "substituted" is meant substituted by halogen, alkyl, nitro, alkoxy, aryloxy, alkylmercapto, arylmercapto and alkenyl.

The group $R^1$ or $R^2$ may be of high molecular weight and either or both may in fact represent macromolecular chains; the compositions of the invention may, therefore, be macromolecular (polymeric) substances as well as lower molecular weight substances.

Since the novel products of this invention may be considered as phosphonate derivatives of the previously described pentacyclo structure, nomenclature difficulties may be avoided by referring to this parent structure (see below) as $C_{10}Cl_{10}$:

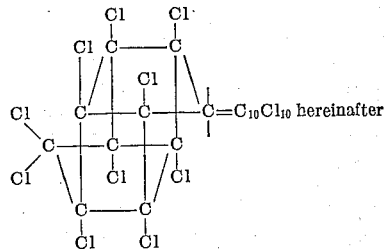

While this structure is believed correct to the best of our present knowledge, what we mean to describe as our invention are the compounds made as described herein, regardless of proposed structure. The generic structure written above will hereinafter be written in abbreviated form as $C_{10}Cl_{10}(OH)PO(OR^1)(OR^2)$, and the specific embodiments will be abbreviated in an analogous fashion.

Examples of compounds of the invention include among others, the following compounds (because of the unsettled and difficult nomenclature, the compounds are represented structurally rather than by names).

$C_{10}Cl_{10}(OH)$—PO—$(OH)_2$
$C_{10}Cl_{10}(OH)$—PO—$(OCH_3)_2$
$C_{10}Cl_{10}(OH)$—PO—$(OH)(OCH_3)$
$C_{10}Cl_{10}(OH)$—PO—$(OC_2H_5)_2$
$C_{10}Cl_{10}(OH)$—PO$(OCH_2CH_2CH_3)_2$
$C_{10}Cl_{10}(OH)$—PO$(OCH(CH_3)_2)_2$
$C_{10}Cl_{10}(OH)$—PO$(OC_4H_9)_2$
$C_{10}Cl_{10}(OH)$—PO$(OC_5H_{12})_2$
$C_{10}Cl_{10}(OH)PO(OC_6H_{13})_2$
$C_{10}Cl_{10}(OH)$—PO$(OC_8H_{17})_2$
$C_{10}Cl_{10}(OH)$—PO$(OC_{10}H_{21})_2$
$C_{10}Cl_{10}(OH)$—PO—$(OC_{12}H_{25})_2$
$C_{10}Cl_{10}(OH)$—PO$(OC_{16}H_{33})_2$
$C_{10}Cl_{10}(OH)$—PO$(OC_{18}H_{37})_2$
$C_{10}Cl_{10}(OH)$—PO$(OCH_2CH=CH_2)_2$
$C_{10}Cl_{10}(OH)$—PO$(OCH(CH_3)CH=CH_2)_2$
$C_{10}Cl_{10}(OH)$—PO$(OC_{18}H_{35})_2$
$C_{10}Cl_{10}(OH)$—PO$(OC_{18}H_{32})_2$
$C_{10}Cl_{10}(OH)$—PO$(OC_{16}H_{31})_2$
$C_{10}Cl_{10}(OH)$—PO$(OCH_2CH_2Cl)_2$
$C_{10}Cl_{10}(OH)PO(OCH_2CHClCH_3)_2$
$C_{10}Cl_{10}(OH)$—PO$(OCH_2CHBrCH_2Br)_2$
$C_{10}Cl_{10}(OH)PO(OCH_2CH_2OC_2H_5)_2$
$C_{10}Cl_{10}(OH)PO(OCH_2CH_2OCH_2CH_2OC_2H_5)_2$
$C_{10}Cl_{10}(OH)$—PO$(OCH_2CH_2OH)_2$ $$C_{10}Cl_{10}(OH)-PO(OCH\underset{CH_2CH_2}{\overset{CH_2CH_2}{\diagup\diagdown}}CH_2)_2$$

$$C_{10}Cl_{10}(OH)-PO(OCH\underset{CH_2ClCH_2}{\overset{CH_2CH_3}{\diagup\diagdown}}CH_2)_2$$

$$C_{10}Cl_{10}(OH)-PO\left(O-\hspace{-3pt}\left\langle\phantom{x}\right\rangle\right)_2$$

$$C_{10}Cl_{10}(OH)-PO\left(O\hspace{-3pt}\left\langle\phantom{x}\right\rangle_{Cl_{1-5}}\right)_2$$

$$C_{10}Cl_{10}(OH)-PO\left(O\hspace{-3pt}\left\langle\phantom{x}\right\rangle_{NO_2}\right)_2$$

$$C_{10}Cl_{10}(OH)-PO\left(O\hspace{-3pt}\left\langle\phantom{x}\right\rangle_{CH_3}\right)_2$$

$$C_{10}Cl_{10}(OH)PO-\left(O\hspace{-3pt}\left\langle\phantom{x}\right\rangle_{alkyl}\right)_2$$

$$C_{10}Cl_{10}(OH)PO-\left(OCH_2\overset{CH-CH_2}{\underset{O}{\diagdown\diagup}}CH_2\right)_2$$

$$C_{10}Cl_{10}(OH)PO\left(OCH_2\overset{CH-CH}{\underset{O}{\diagdown\diagup}}CH\right)_2$$

$C_{10}Cl_{10}(OH)PO(OC_6H_5)OCH_2$
  $CH_2OP(OC_6H_5)C_{10}Cl_{10}(OH)$

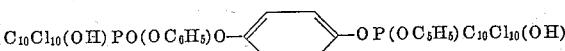

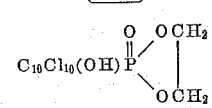

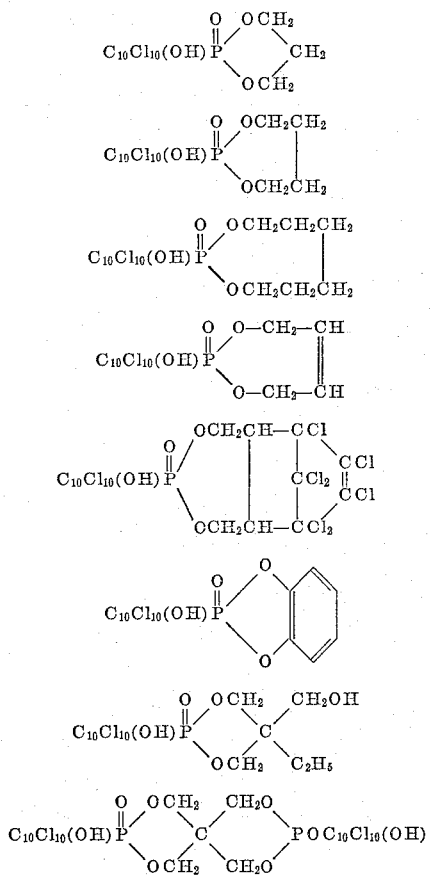

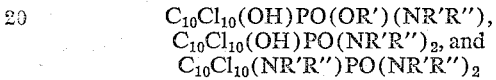

While the causes of marine fouling are presently obscure, its effect on economic and military affairs is readily apparent. It is estimated that the cost of preventing, slowing down and treating marine fouling runs into millions of dollars annually, and no satisfactory solution is in sight. For example, the efficiency and the period of use of a pier, ship, boat, buoy or marine structure is greatly reduced unless some prophylactic treatment is followed. Ships which have become encrusted with marine organisms lose a substantial part of their normal speed and mechanical efficiency. Furthermore, many ships and marine structures such as bulkheads, buoys, off-shore radar towers and oil drilling rigs and platforms, once fouled, are much more prone to become corroded or rotted. For this reason, an extensive and costly program of prophylaxis and maintenance is followed in an effort to cut down the even more expensive deleterious effects of the marine fouling.

The most common method of reducing the amount of the shell-like encrustation built up by the lower forms of marine life such as barnacles or other lower marine creatures is to paint the material to be protected with a special copper oxide based paint. However, the amount of copper oxide required adversely affects the physical characteristics of the paint and its normal life is reduced. In addition, the presence of a large quantity of copper oxide on a metal boat or ship will eventually create an electrolytic cell which greatly accelerates the tendency toward corrosion. To prevent this electrolytic corrosion the surface must first be covered by an additional and expensive coat of paint to insulate the copper oxide from the hull. But even when so protected, the hull of any ship or boat must be routinely scraped to remove the fouled surface which forms albeit more slowly. Obviously too, this is expensive, since in addition to requiring costly and time-consuming dry-docking, scraping and repainting, the ship is removed from profitable use. For the above reasons, it can readily be seen that the discovery of compounds possessing anti-marine fouling properties at low concentrations is of extreme commercial importance. While the mechanism by which the compounds of this invention retard marine fouling is not understood, it has been found that these compounds function well at economically feasible concentrations, are non-corrosive in themselves and being readily compatible with the oils, bases and adjuvants commonly used in paints can readily be formulated in marine paints and coatings in general.

While the compounds of this invention are advantageous as anti-marine fouling agents, they possess in addition other important advantages. For example, the novel compositions of this invention are useful as fire retardants and mildew retardants when formulated in organic coatings.

In addition, these compositions may be used as intermediates in the preparation of other anti-fouling compositions. Thus, when an ester $C_{10}Cl_{10}(OH)PO(OR^1)(OR^2)$ is heated with one to three moles of an amide $R'R''NH$, phosphonamides of the type $C_{10}Cl_{10}(OH)PO(OR')(NR'R'')$,
$C_{10}Cl_{10}(OH)PO(NR'R'')_2$, and
$C_{10}Cl_{10}(NR'R'')PO(NR'R'')_2$ are produced. These compounds also have activity as marine anti-fouling substances and as biotoxicants.

A related but ancillary advantage that the compounds of this invention possess generally is that they are valuable intermediates for organic synthesis, in that the reactive and free OH group may be further acylated by acylating agents such as acid chlorides and alkylated by alkylating agents such as alkyl sulfates to make compounds of the type $C_{10}Cl_{10}(OR^3)PO(OR^1)(OR^2)$ where $R^3$ is alkyl or acyl.

The need for effective fire-retardant resins, films, coatings, foams and elastomers has become especially acute with the increasing dependence upon resins and polymeric substances as construction materials. For example, today a wide variety of articles of commerce such as houses, boats, aircraft, automobiles, household appliances (as well as their parts or coating), formerly manufactured out of fire resistant materials such as metal or stone are now produced from resins or resin-containing laminates. Yet all of these items to be acceptable must be fire-retardant or resistant. While it has been known for some time that various chlorine and phosphorus-containing compounds can impart fire retardancy to resins, the problem has been to find compositions which while reducing flammability, do not adversely affect the desirable properties of the resin, its strength, stability to heat, light, moisture and oxygen, as well as its aesthetic appearance. Ideally, a fire-retardant additive must not only have the positive attribute of increasing fire-retardance, being economical and stable, but in addition, it must not tend to migrate, diffuse, segregate nor contribute to instability toward light, moisture, oxygen nor plasticize the resin unduly. Because of these rather stringent requirements, few fire-retardant additives have been entirely satisfactory.

However, the applicants have found unexpectedly that their novel phosphonate esters combine all of the characteristics of a desirable fire-retardant additive that is low cost, good fire-retardance, good chemical and physical stability and low vapor pressure and plasticizing character and generally good compatibility with resin components. This combination of desirable characteristics allows the phosphonate ester products of this invention to be incorporated into resins of diverse characteristics and formulations including but not limited to polystyrenes, polyacrylates and methacrylates, polyolefins, diene polymers, asphalts, indenecoumarone resins, petroleum resins, vinyl resins, polyester resins, phenolic resins, epoxy resins, polycarbonate resins, urea and melamine resins, natural gum resins and resinous coatings.

The fire-retardant additives of this invention may be used in different forms of resins including moldings, castings, laminates, films, foams, extrusions, coatings and filaments among others.

In certain instances, where $R^1$ or $R^2$ is unsaturated (e.g., allyl), the inventive phosphonate resins may be co-polymerized with monomers such as vinyl monomers, to make flame-retardant co-polymers.

The compounds of this invention range from liquids to high melting solids, depending on the groups $R^1$ and $R^2$ and may be made by the following reaction:

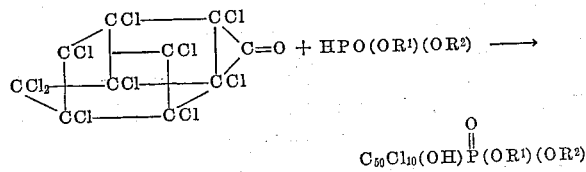

where $R^1$ and $R^2$ are defined as heretofore. The preparation and structure of the perchloropentacyclodecanone has been described by McBee et al., J. Am. Chem. Soc., 78 1511 (1956).

Thus, suitable reactants of the type $HOP(OR^1)(OR^2)$ are phosphorous acid, and mono and di esters of phosphorus acid. Suitable esters are in general any mono and di ester of phosphorous acid. Examples of these esters include but are not limited to methyl phosphite, dimethyl phosphite, diethyl phosphite, dipropylphosphite, dibutylphosphite, dihexyl phosphite, dioctyl phosphite, didecyl phosphite, didodecyl phosphite, distearyl phosphite, dioleyl phosphite, dilinoleyl phosphite, methyl linoleyl phosphite, di(2-chloroethyl)phosphite, di(2-chloropropyl phosphite), bis-(2,3-dibromopropyl) phosphite, diallyl phosphite, dimethallyl phosphite, di(ethoxyethyl) phosphite, di(carbityl)phosphite, di(cyclohexyl) phosphite, dibenzyl phosphite, diphenyl phosphite, phenyl phosphite, dicresyl phosphite, di(chlorinated-phenyl)phosphite, di(alkylated-phenyl) phosphite, di(tetrahydrofurfuryl) phosphite, 1,2-bis(phenylphosphito)ethane, 1,2-bis(2-chloroethyl phosphito) ethane and such cyclic phosphites as ethylene phosphite, trimethylene phosphite, tetramethylene phosphite, pentamethylene phosphite, hexamethylene phosphite, butenediol phosphite, and such complex phosphites as

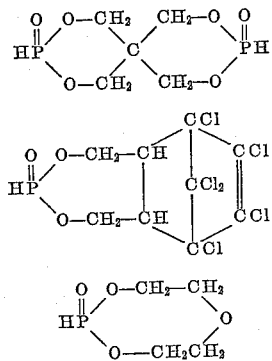

to name a few. The esters of phosphorous acid are preferred over the free phosphorous acid because of greater stability and compatibility of the products with resins.

The process of the invention is conducted by admixing the two reactants, preferably in 1:1 molar ratio of $C_{10}Cl_{10}O$ to $HPO(OR^1)(OR^2)$, or with a small excess of the phosphite, and warming if necessary to complete the reaction. The reaction can be carried out even below zero degrees centigrade with most phosphites but proceeds more rapidly at higher temperatures up to the boiling point or decomposition point of the phosphite. However, it is not necessary to exceed one hundred and fifty degrees centigrade for even the more sluggishly-reacting phosphites. Thus, the preferred range is zero degrees to one hundred and fifty degrees centigrade. Where the phosphite is a liquid at the desired reaction temperature no solvent is necessary, but in order to facilitate heat transfer and mixing, the use of a solvent is convenient and preferred. Any solvent inert to the two reactants may be used; suitable solvents are for example aromatic hydrocarbons such as toluene, chlorinated hydrocarbons such as perchloroethylene, ketones such as acetone, esters such as butyl acetate, ethers such as diisopropyl ether, and N,N-dialkyl amides such as dimethylformamide.

Isolation of the product is done either by filtration when it is insoluble in the chosen solvent, or by evaporation of the solvent. Distillation as a means of purification is not generally practical because of the compositions' extremely high boiling points. Purification, where desired, is generally done by recrystallization from a solvent.

The diesters of the invention may be saponified to monoesters or to the acid or salts thereof by heating with water or with a base such as caustic soda or potash in alcohol. They may also be converted to novel amides by treatment with ammonia or amines. Such amides share many of the useful properties of the esters.

*Example 1*

The ketone $C_{10}Cl_{10}O$ is prepared as follows: A charge of one hundred and eighty-eight parts (.69 mol), of hexachlorocyclopentadiene is cooled to five to ten degrees centigrade and to the agitated charge is added gradually nine hundred and forty parts of sixty percent oleum (containing five hundred and sixty-five parts (7.1 mols), of free $SO_3$). After addition of all the oleum, which requires about one hour, the mixture, whose temperature rises progressively to about seventy degrees centigrade, is added slowly to a large volume (five thousand parts), of water to dilute the acid. The crude precipitates immediately upon contact of the charge with the water, as a white solid. The product is filtered from the spent acid, stirred three times with fresh water, and filtered after each water wash, to remove most of the sulfuric acid. The product is further purified by dissolving it in five hundred parts of ninety-five percent ethanol, reprecipitating by the addition of five hundred parts water, filtering and drying. The hydrated ketone is dehydrated by refluxing with xylene in a flask fitted with a Dean-Stark trap until no further water is evolved, then stripping the xylene off. The infra-red spectrum confirmed the identity of the product.

A mixture of 18.8 parts of dimethylphosphite, 49.1 parts of the ketone $C_{10}Cl_{10}O$ (prepared as described above), and two hundred parts of xylene are heated at ninety degrees centigrade for sixteen hours. The solvent is then removed by evaporation under reduced pressure, and the residual solid recrystallized from carbon tetrachloride to obtain thirty-four parts of colorless crystalline solid, melting point two hundred and ten to two hundred and twelve degrees. The infrared spectrum shows bands indicative of the —OH, —CH$_3$, and —P=O structures, and no bands indicative of a carbonyl group.

*Analysis.*—Calcd. for $C_{12}H_7O_4PCl_{10}$: Cl, 60.7 percent; P, 5.2 percent. Found: Cl, 59.7 percent; P, 5.7 percent.

*Example 2*

A mixture of 45.5 parts of di-n-butyl phosphite, 49.1 parts of the ketone $C_{10}Cl_{10}O$, and two hundred parts of xylene is heated at ninety degrees for nineteen hours. The solvent is stripped off under vacuum and the residue washed with hexane, leaving a hexane-insoluble colorless solid, melting point one hundred and fifty degrees.

*Analysis.*—Calcd. for $C_{18}H_{19}O_4PCl_{10}$: Cl, 49.8 percent; P, 4.3 percent. Found: Cl, 50.6 percent; P, 4.7 percent.

*Example 3*

A mixture of eighty-four parts of dilauryl phosphite, ninety-eight parts of the ketone $C_{10}Cl_{10}O$ and four hundred parts of xylene is heated for nineteen hours at one hundred degrees. The solvent is then stripped off under vacuum at one hundred degrees leaving a quantitative yield of a nearly colorless oil, whose infrared spectrum shows the absence of the carbonyl group and the presence of the P=O and —OH groups.

*Analysis.*—Calcd. for $C_{34}H_{51}O_4PCl_{10}$: Cl, 39.2 percent; P, 3.4 percent. Found: Cl, 38.2 percent; P, 2.8 percent.

Example 4

A mixture of 46.8 parts of diphenyl phosphite, 49.1 parts of the ketone $C_{10}Cl_{10}O$, and two hundred parts of toluene is heated at ninety degrees for forty-three hours, then the solvent evaporated by application of vacuum. The residue is recrystallized from carbon tetrachloride to obtain thirty-eight parts of colorless solid, melting point two hundred and thirty-nine degrees centigrade.

*Analysis.*—Calcd. for $C_{22}H_{11}O_4PCl_{10}$: Cl, 48.8 percent. Found: Cl, 48.9 percent.

Example 5

A mixture of 17.8 parts of diallyl phosphate, 49.1 parts of the ketone $C_{10}Cl_{10}O$, and two hundred parts of chlorobenzene are heated for two hours at ninety degrees, then the solvent stripped off by applying vacuum and the residue recrystallized from xylene to obtain sixty-three parts of a colorless solid, melting point two hundred and ten degrees.

*Analysis.*—Calcd. for $C_{16}H_{11}O_4PCl_{10}$: Cl, 54.5 percent. Found: Cl, 54.3 percent.

Example 6

A mixture of forty parts of cyclic phosphite of commercial hexylene glycol, 49.1 parts of the ketone $C_{10}Cl_{10}O$, and two hundred parts of benzene is refluxed for one day, then evaporated under reduced pressure to remove the benzene and excess phosphite. A substantially theoretical yield of an almost colorless viscous syrup is obtained which upon standing partially solidifies.

*Analysis.*—Calcd. for $C_{16}H_{13}O_4PCl_{10}$: Cl, 54.3 percent; P, 4.74 percent. Found: Cl, 53.9, percent; P, 4.8 percent.

Example 7

The $C_{10}Cl_{10}O$ ketone of Example 1 is reacted with the following phosphonates using analogous synthetic techniques, equipment and the like as set forth in detail in Examples 1–6. The left hand column gives the compound formed and the right hand column gives the other reactant used. The hydroxy-phosphonate structure was confined by infrared spectra.

| Compound | Derived from— |
|---|---|
| $C_{10}Cl_{10}(OH)$—$PO(OH)_2$ | $HPO(OH)_2$ |
| $C_{10}Cl_{10}(OH)PO(OCH_3)_2$ | $HPO(OCH_3)_2$ |
| $C_{10}Cl_{10}(OH)$—$PO(OH)(OCH_3)$ | $HPO(OH)(OCH_3)$ |
| $C_{10}Cl_{10}(OH)$—$PO(OC_2H_5)_2$ | $HPO(OC_2H_5)_2$ |
| $C_{10}Cl_{10}(OH)$—$PO(OCH_2CH_2CH_3)_2$ | $HPO(OCH_2CH_2CH_3)_2$ |
| $C_{10}Cl_{10}(OH)$—$PO(OCH(CH_3)_2)_2$ | $HPO(OCH(CH_3)_2)_2$ |
| $C_{10}Cl_{10}(OH)$—$PO(OC_4H_9)_2$ | $HPO(OC_4H_9)_2$ |
| $C_{10}Cl_{10}(OH)$—$PO(OC_5H_{12})_2$ | $HPO(OC_5H_{12})_2$ |
| $C_{10}Cl_{10}(OH)PO(OC_6H_{13})_2$ | $HPO(OC_6H_{13})_2$ |
| $C_{10}Cl_{10}(OH)$—$PO(OC_8H_{17})_2$ | $HPO(OC_8H_{17})_2$ |
| $C_{10}Cl_{10}(OH)$—$PO(OC_{10}H_{21})_2$ | $HPO(OC_{10}H_{21})_2$ |
| $(C_{10}Cl_{10}(OH)$—$PO(OC_{12}H_{25})_2$ | $HPO(OC_{12}H_{25})_2$ |
| $C_{10}Cl_{10}(OH)$—$PO(OC_{16}H_{33})_2$ | $HPO(OC_{16}H_{33})_2$ |
| $C_{10}Cl_{10}(OH)$—$PO(OC_{18}H_{37})_2$ | $HPO(OC_{18}H_{37})_2$ |
| $C_{10}Cl_{10}(OH)$—$PO(OCH_2CH=CH_2)_2$ | $HPO(OCH_2CH=CH_2)_2$ |
| $C_{10}Cl_{10}(OH)$—$PO(OCH(CH_3)CH=CH_2)_2$ | $HPO(OCH(CH_3)CH=CH_2)_2$ |
| $C_{10}Cl_{10}(OH)$—$PO(OC_{18}H_{35})_2$ | $HPO(OC_{18}H_{35})_2$ |
| $C_{10}Cl_{10}(OH)$—$PO(OC_{18}H_{33})_2$ | $HPO(OC_{18}H_{33})_2$ |
| $C_{10}Cl_{10}(OH)$—$PO(OC_{16}H_{31})_2$ | $HPO(OC_{16}H_{31})_2$ |
| $C_{10}Cl_{10}(OH)$—$PO(OCH_2CH_2Cl)_2$ | $HPO(OCH_2CH_2Cl)_2$ |
| $C_{10}Cl_{10}(OH)PO(OCH_2CHClCH_3)_2$ | $HPO(OCH_2CHClCH_3)_2$ |
| $C_{10}Cl_{10}(OH)$—$PO(OCH_2CHBrCH_2Br)_2$ | $HPO(OCH_2CHBrCH_2Br)_2$ |
| $C_{10}Cl_{10}(OH)$—$PO(OCH_2CH_2OC_2H_5)_2$ | $HPO(OCH_2CH_2OC_2H_5)_2$ |
| $C_{10}Cl_{10}(OH)PO(OCH_2CH_2OCH_2CH_2OC_2H_5)_2$ | $HPO(OCH_2CH_2OCH_2CH_2OC_2H_5)_2$ |
| $C_{10}Cl_{10}(OH)$—$PO(OCH_2CH_2OH)_2$ | $HPO(OCH_2CH_2OH)_2$ |
| $C_{10}Cl_{10}(OH)$—$PO\left(OCH\begin{smallmatrix}CH_2CH_2\\ \\CH_2CH_2\end{smallmatrix}CH_2\right)_2$ | $HPO\left(OCH\begin{smallmatrix}CH_2CH_2\\ \\CH_2CH_2\end{smallmatrix}CH_2\right)_2$ |
| $C_{10}Cl_{10}(OH)$—$PO\left(OCH\begin{smallmatrix}CH_2CH_2\\ \\CHClCH_2\end{smallmatrix}CH_2\right)_2$ | $HPO\left(OCH\begin{smallmatrix}CH_2CH_2\\ \\CHClCH_2\end{smallmatrix}CH_2\right)_2$ |
| $C_{10}Cl_{10}(OH)PO(O-\text{C}_6\text{H}_5)_2$ | $HPO(O-\text{C}_6\text{H}_5)_2$ |
| $C_{10}Cl_{10}(OH)$—$PO(O-\text{C}_6\text{H}_{5-n}\text{Cl}_{1-5})_2$ | $HPO(O-\text{C}_6\text{H}_{5-n}\text{Cl}_{1-5})_2$ |

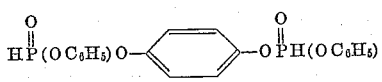

*Example 8.—(Fire retardancy test)*

The testing was carried out by the method of ASTM Test D635–56T, which is conducted briefly as follows: A test bar five inches by one-half inch by one-eighth of an inch, composed of polystyrene containing fifteen percent of the product of Example 1 or 4, is supported horizontally and exposed for thirty seconds to the direct flame of a Bunsen burner. The resin bars containing the additives were self-extinguishing.

*Example 9*

A similar test to the foregoing was done with polypropylene of which it is more difficult to repress the flammability. At thirty percent loading with the products of Examples 1–5, burning rates of 0.1 to 0.2 inch per minute are observed. In comparison, thirty percent of the ketone $C_{10}Cl_{10}O$ in polypropylene gives a burning rate of 0.64 inch per minute, and polypropylene without additive gives a burning rate of one to 1.5 inches per minute.

*Example 10.—A formulation of marine paint having anti-fouling properties*

The following ingredients are blended and ground together in a ball mill. Six different formulations are made up differing only by the phosphonate ester product used.

| Ingredient: | Pounds per 100 gallons |
| --- | --- |
| Gum rosin, grade WW | 277 |
| Blown fish oil | 118 |
| Zinc stearate | 18 |
| A product from Examples 1–6 | 197 |
| Zinc oxide | 161 |
| Magnesium silicate | 56 |
| Solvent naphtha, approx.[1] | 241 |
| Lampblack | 1 |

[1] Volume adjusted to 100 gal. by addition of naphtha.

*Example 11.—Another formulation of a marine paint having anti-fouling properties*

The following ingredients are blended and ground together in a ball mill. Six different formulations are made up differing only in the phosphonate ester used.

| Ingredient: | Pounds per 100 gallons |
| --- | --- |
| Rosin | 311 |
| Hydrogenated methyl abietate | 115.5 |
| Coal tar naphtha | 92.4 |
| Mineral spirits (paint thinner) (approx.)[1] | 103.7 |
| Diatomaceous silica | 103.7 |
| A product from Examples 1–6 | 311 |
| Lampblack | 1.0 |

[1] Volume adjusted to 100 gallons by addition of mineral spirits.

*Example 12.—Additional formulations of marine paints having anti-fouling properties*

The following ingredients are blended together in the indicated proportions in a ball mill using a product obtained from the preparations of Examples 1–6. Thus, six formulations differing only in active ingredient are prepared.

| Ingredient: | Pounds per 100 gallons |
| --- | --- |
| Rosin | 265 |
| Coal tar | 80 |
| Talc | 80 |
| Pine oil | 42 |
| $C_{10}Cl_{10}(OH)(PO(OCH_3)_2)$ from Example 1 | 200 |
| High flash naphtha | 135 |
| Mineral spirits | (1) |

[1] Make up to volume.

*Example 13.—Additional formulations of marine paints having anti-fouling properties*

The following ingredients are blended together in the denoted proportions in a roller mill. Six formulations are prepared differing only in the $C_{10}Cl_{10}(OH)$ phosphonate ester used.

| Ingredient: | Percent by weight |
| --- | --- |
| Chlorinated rubber (Parlon S–125) | 2.5 |
| Rosin | 20.00 |
| Dibutyl phthalate | 0.30 |
| Titanium dioxide pigment | 21.65 |
| Zinc oxide | 8.55 |
| Cobalt naphthenate | 0.05 |
| Lead naphthenate | 0.19 |
| Phenoxypropylene oxide | 0.13 |
| $C_{10}Cl_{10}(OH)$ phosphonate ester from Examples 1–6 | 5.00 |
| Xylene | remainder |

*Example 14.—Testing of paint formulations of the preceding examples for anti-fouling properties*

The formulations disclosed in the preceding examples are painted on steel test panels, allowed to dry and immersed in sea water at a sub-tropical location. At the same time other identical panels are painted with control test formulations identical with these paint preparations except that the phosphonate derivatives are omitted from the formulation. These test panels are immersed in the same subtropical sea water. After one month, both the control test panels and the panels containing the active component are examined and compared. It is found that the control panels are heavily crusted with a mixed population of barnacles and other marine organisms, while the panels containing the active anti-marine fouling component were not fouled to any serious degree.

*Example 15.—Copolymerization of product of Example 5*

The product of Example 5 was mixed with ten parts by weight of styrene monomer and 0.1 percent by weight of benzoyl peroxide was added. The mixture was heated to one hundred degrees centigrade until polymerization occurred.

The resulting polymer was selfextinguishing when ignited.

We claim:

1.

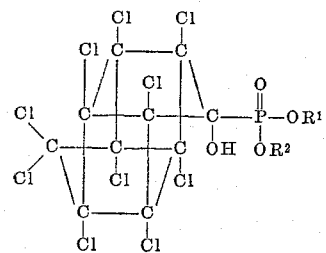

wherein $R^1$ and $R^2$ are independently selected from the group consisting of hydrogen; alkyl of up to 18 carbon atoms; substituted alkyl of up to 18 carbon atoms, in which the substituents are selected from the group consisting of halogen, alkoxy, aryloxy, nitro, alkylmercapto, arylmercapto and alkenyl; aryl; substituted aryl, in which the substituents are selected from the group consisting of halogen, alkoxy, aryloxy, nitro, alkylmercapto, arylmercapto, substituents are selected from the group consisting of halo- wherein $R^1$ and $R^2$ are conjoined; substituted alkylene of up to 18 carbon atoms, in which the substituents are selected from the group consisting of halogen, alkoxy, aryloxy, nitro, alkylmercapto, arylmercapto, alkyl and alkenyl; phenylene, wherein $R^1$ and $R^2$ are conjoined through the phenyl group; and substituted phenylene of 6 to 18 carbon atoms, in which the substituents are selected from the group consisting of halogen, alkoxy, aryloxy, nitro, alkylmercapto, arylmercapto, alkyl and alkenyl, whereinabove aryl is monocarbocyclic.

2. A compound according to claim 1 in which $R^1$ and $R^2$ are alkyl groups of up to 18 carbon atoms.

3. A compound according to claim 1 in which $R^1$ and $R^2$ are alkenyl groups of up to 18 carbon atoms.

4.

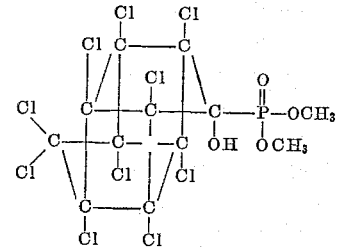

5.
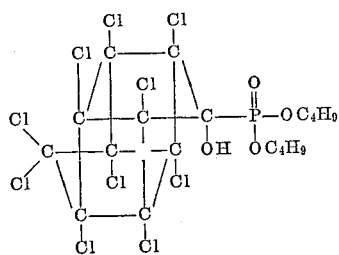
6.
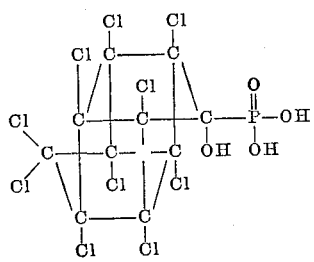
7.
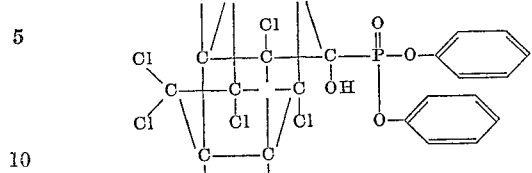
8.
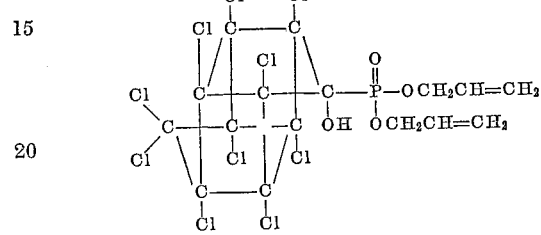
References Cited by the Examiner
UNITED STATES PATENTS
2,616,928  11/52  Gilbert et al. ---------- 260—586
NICHOLAS S. RIZZO, *Primary Examiner.*
WALTER A. MODANCE, IRVING MARCUS,
*Examiners.*

UNITED STATES PATENT OFFICE
CERTIFICATE OF CORRECTION

Patent No. 3,202,692

August 24, 1965

Edward D. Weil et al.

It is hereby certified that error appears in the above numbered patent requiring correction and that the said Letters Patent should read as corrected below.

Column 2, lines 55 to 58, the formula should appear as shown below instead of as in the patent:

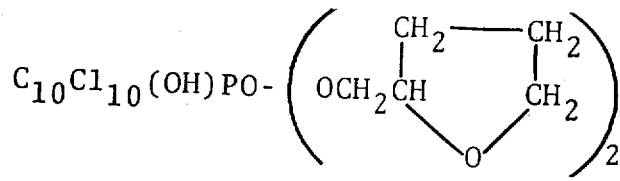

same column 2, lines 64 and 65, for

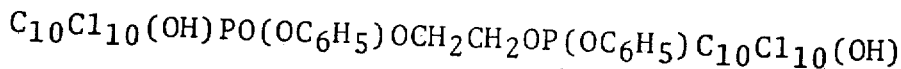

read

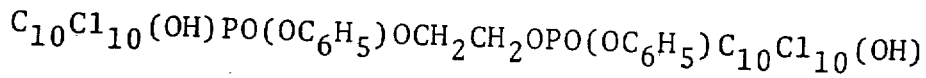

same column 2, lines 66 to 68, for

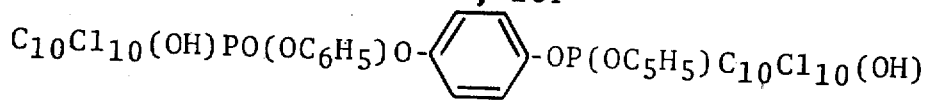

read

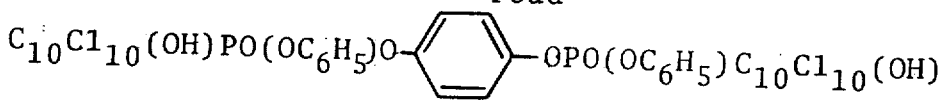

column 5, lines 10 to 17, the formula should appear as shown below instead of as in the patent:

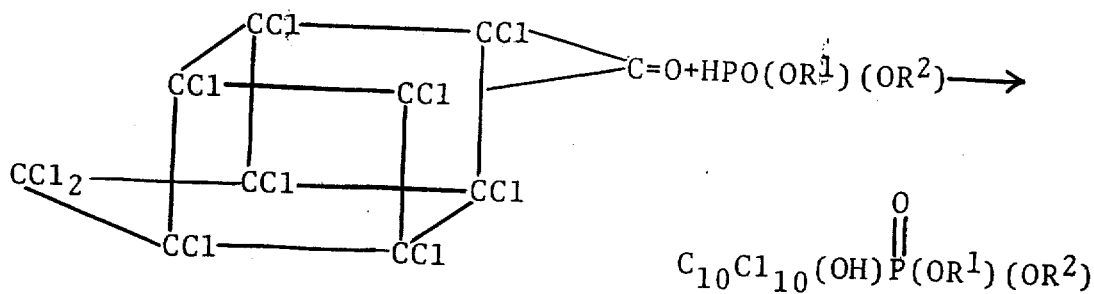

column 8, line 24, for "confined" read -- confirmed --; columns 7 and 8, in the table, under the heading "Derived from-", the twenty-third formula, for "HPO(OCH$_2$CH$_2$OC$_2$Hr)$_2$" read -- HPO(OCH$_2$CH$_2$OC$_2$H$_5$)$_2$ --; same table, under the heading "Compound", the last formula should appear as shown below instead of as in the patent:

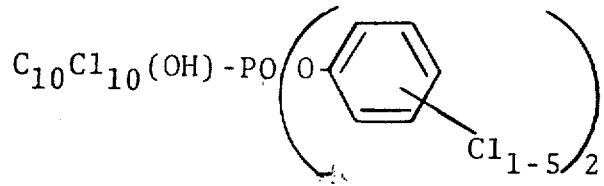

columns 9 and 10, in the table, under the heading "Compound", the second formula should appear as shown below instead of as in the patent:

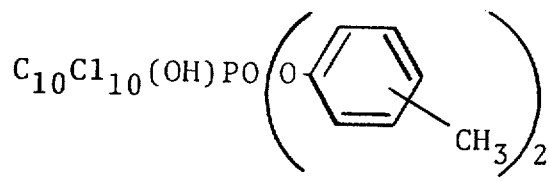

same columns 9 and 10, in the table, under the heading "Compound", the thirteenth formula should appear as shown below instead of as in the patent:

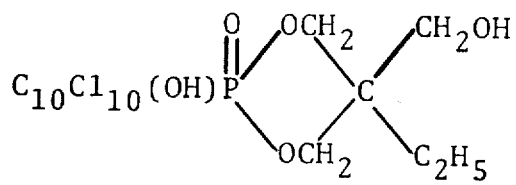

column 9, lines 64 to 66, the formula should appear as shown below instead of as in the patent:

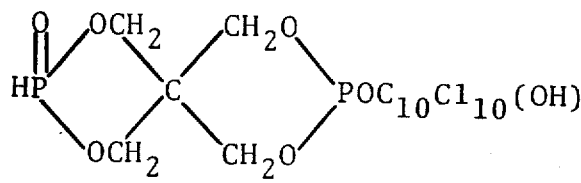

same column 9, lines 68 and 69, the formula should appear as shown below instead of as in the patent:

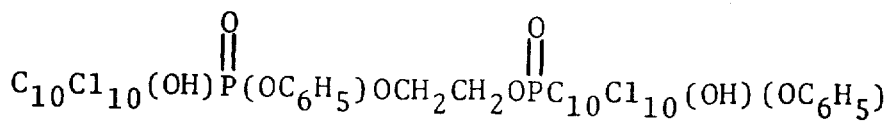

same column 9, lines 74 to 76, the formula should appear as shown below instead of as in the patent:

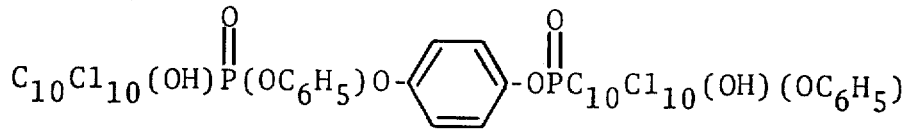

column 12, line 49, for "substituents are selected from the group consisting of halo-" read -- alkyl and alkenyl; alkylene of up to 18 carbon atoms, --.

Signed and sealed this 29th day of November 1966.

(SEAL)
Attest:

ERNEST W. SWIDER
Attesting Officer

EDWARD J. BRENNER
Commissioner of Patents